US012778200B2

(12) United States Patent
Zhou et al.

(10) Patent No.: US 12,778,200 B2
(45) Date of Patent: Nov. 3, 2026

(54) ELECTRONIC VAPORIZATION DEVICE AND VAPORIZER THEREOF

(71) Applicant: SHENZHEN SMOORE TECHNOLOGY LIMITED, Shenzhen (CN)

(72) Inventors: Ruilong Zhou, Shenzhen (CN); Wenjie Dong, Shenzhen (CN); Bosong Zhao, Shenzhen (CN); Xinyu Wang, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 509 days.

(21) Appl. No.: 18/468,074

(22) Filed: Sep. 15, 2023

(65) Prior Publication Data

US 2024/0000151 A1 Jan. 4, 2024

Related U.S. Application Data

(63) Continuation of application No. PCT/CN2021/081512, filed on Mar. 18, 2021.

(51) Int. Cl.

| | |
|---|---|
| ***A24F 40/53*** | (2020.01) |
| ***A24F 40/10*** | (2020.01) |
| ***A24F 40/46*** | (2020.01) |
| ***A24F 40/485*** | (2020.01) |
| ***H05B 3/06*** | (2006.01) |

(52) U.S. Cl.

CPC .............. *A24F 40/46* (2020.01); *A24F 40/10* (2020.01); *A24F 40/485* (2020.01); *A24F 40/53* (2020.01); *H05B 3/06* (2013.01); *H05B 2203/016* (2013.01); *H05B 2203/021* (2013.01)

(58) Field of Classification Search

CPC .......... A24F 40/40; A24F 40/50; A24F 40/51; A24F 47/00; A24F 40/46; A24F 40/53

See application file for complete search history.

(56) References Cited

U.S. PATENT DOCUMENTS

| | | | | |
|---|---|---|---|---|
| 2013/0284194 | A1 | 10/2013 | Newton | |
| 2014/0020696 | A1 * | 1/2014 | Liu | A61M 15/06 131/329 |
| 2018/0296779 | A1 * | 10/2018 | Takeuchi | G05F 1/66 |

FOREIGN PATENT DOCUMENTS

| | | | | |
|---|---|---|---|---|
| CN | 102326869 A | | 1/2012 | |
| CN | 203398240 U | * | 1/2014 | A24F 40/40 |
| CN | 104872822 A | | 9/2015 | |

(Continued)

OTHER PUBLICATIONS

English machine translation of CN104872822 (Year: 2015).*

(Continued)

*Primary Examiner* — Robert C Dye

(74) *Attorney, Agent, or Firm* — Leydig, Voit & Mayer, Ltd.

(57) ABSTRACT

A vaporizer includes: an electrically conductive base; an ejector pin disposed on the electrically conductive base in an insulated manner; and an anti-counterfeiting module electrically connected to the electrically conductive base and the ejector pin, respectively. In an embodiment, the anti-counterfeiting module is disposed in the electrically conductive base. A through hole is provided on the anti-counterfeiting module. The ejector pin penetrates into the through hole.

18 Claims, 6 Drawing Sheets

(56) References Cited

FOREIGN PATENT DOCUMENTS

| | | | |
|---|---|---|---|
| CN | 108778384 | A | 11/2018 |
| CN | 110447972 | A | 11/2019 |
| CN | 209862306 | U | 12/2019 |
| CN | 212590271 | U | 2/2021 |

OTHER PUBLICATIONS

English machine translation of CN203398240U (Year: 2014).*
English machine translation of CN110447972 (Year: 2019).*
Patent Cooperation Treaty, International Search Report and Written Opinion, International Application No. PCT/CN2021/081512 (Dec. 15, 2021).

* cited by examiner

ELECTRONIC VAPORIZATION DEVICE AND VAPORIZER THEREOF

CROSS-REFERENCE TO PRIOR APPLICATION

This application is a continuation of International Patent Application No. PCT/CN2021/081512, filed on Mar. 18, 2021. The entire disclosure is hereby incorporated by reference herein.

FIELD

The present invention relates to the field of vaporization, and more specifically, to an electronic vaporization device and a vaporizer thereof.

BACKGROUND

An anti-counterfeiting module of an existing electronic vaporization device is generally assembled by using conventional screws, buckles, or the like. However, under the condition of a limited structural space of the electronic vaporization device, it is difficult to implement such an assembly structure. How to assemble an anti-counterfeiting module in a small space and ensure reliability of contact is a problem to be resolved.

SUMMARY

In an embodiment, the present invention provides a vaporizer, comprising: an electrically conductive base; an ejector pin disposed on the electrically conductive base in an insulated manner; and an anti-counterfeiting module electrically connected to the electrically conductive base and the ejector pin, respectively.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
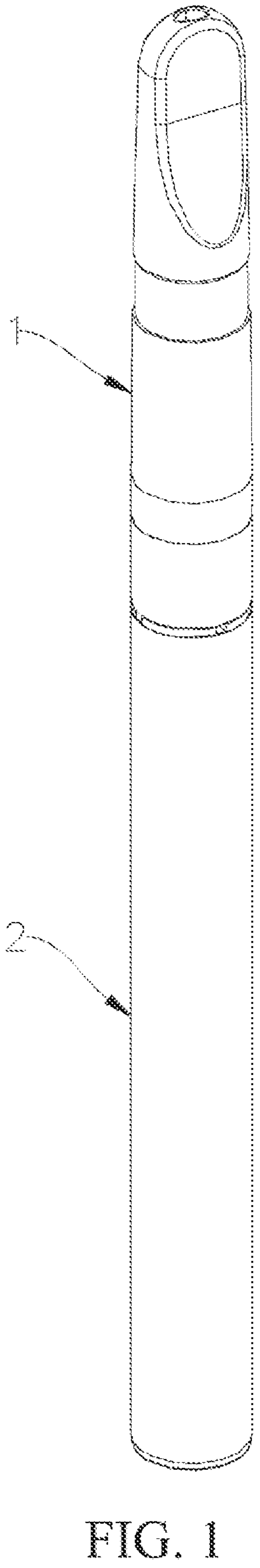
FIG. 1 is a schematic three-dimensional structural diagram of an electronic vaporization device according to a first embodiment of the present invention.

In an embodiment, the present invention provides an improved vaporizer and an electronic vaporization device with the vaporizer for the foregoing defects in the related art.

In an embodiment, the present invention provides a vaporizer, which includes an electrically conductive base, an ejector pin disposed on the base in an insulated manner, and an anti-counterfeiting module that is electrically connected to the base and the ejector pin respectively.

In some embodiments, the anti-counterfeiting module is disposed in the base, a through hole is provided on the anti-counterfeiting module, and the ejector pin penetrates into the through hole.

In some embodiments, the hole wall of the through hole is in electrical contact with the outer wall surface of the ejector pin.

In some embodiments, a step configured to support the anti-counterfeiting module is formed on the inner wall surface of the base, and at least part of the lower end surface of the anti-counterfeiting module is in electrical contact with the step.

In some embodiments, the vaporizer further includes a housing with a liquid storage cavity formed inside and a vaporization component that is disposed in the housing and in fluid communication with the liquid storage cavity. The vaporization component is electrically connected to the base and the ejector pin respectively.

In some embodiments, the vaporization component includes a first pin and a second pin, and a first via and a second via for the first pin and the second pin to pass through are respectively provided on the anti-counterfeiting module.

In some embodiments, the first pin is welded to the first via for electrical connection, and/or the second pin is welded to the second via for electrical connection.

In some embodiments, the first pin includes a first contact part; and the first pin passes through the first via and bends to cause the first contact part to be clamped between the anti-counterfeiting module and the base, to be in electrical contact with the base.

In some embodiments, the second pin includes a second contact part; and the second pin passes through the second via and bends to cause the second contact part to be clamped between the anti-counterfeiting module and the ejector pin, to be in electrical contact with the ejector pin.

In some embodiments, the vaporizer further includes an insulating sleeve that is disposed between the base and the ejector pin to insulate the base and the ejector pin.

In some embodiments, the first pin passes through the first via and is clamped between the outer wall surface of the insulating sleeve and the inner wall surface of the base, to be in electrical contact with the base.

In some embodiments, the second pin passes through the second via and is clamped between the inner wall surface of the insulating sleeve and the outer wall surface of the ejector pin, to be in electrical contact with the ejector pin.

In some embodiments, the vaporizer further includes a protective sleeve disposed on the side of the anti-counterfeiting module facing the liquid storage cavity.

In some embodiments, two electrode holes for the first pin and the second pin to pass through are respectively provided on the protective sleeve, and a thin wall for the first pin and the second pin to pierce through is formed in the two electrode holes.

In some embodiments, the vaporizer further includes a vent tube disposed in the housing, the liquid storage cavity is defined between the inner wall surface of the housing and the outer wall surface of the vent tube, and the vaporization component is disposed in the vent tube.

In some embodiments, at least one air inlet hole in communication with the outside is provided on the base, and at least one air inlet channel in communication with the at least one air inlet hole is formed on the ejector pin.

In some embodiments, a block wall is disposed on the side of each air inlet hole facing the anti-counterfeiting module, to separate the air inlet hole from the anti-counterfeiting module.

In some embodiments, the anti-counterfeiting module is a PCB circuit board.

The present invention further provides an electronic vaporization device, including the vaporizer according to any one of the above.

Beneficial Effects:

The implementation of the present invention has at least the following beneficial effects: The anti-counterfeiting module is electrically connected to the base and the ejector pin respectively to supply power to the anti-counterfeiting module. This structural configuration facilitates assembly of the anti-counterfeiting module in a limited structural space of the electronic vaporization device and ensures reliability of contact.

For a clearer understanding of technical features, objectives, and effects of the present invention, specific implementations of the present invention are described in detail with reference to the accompanying drawings.

Figure 2:
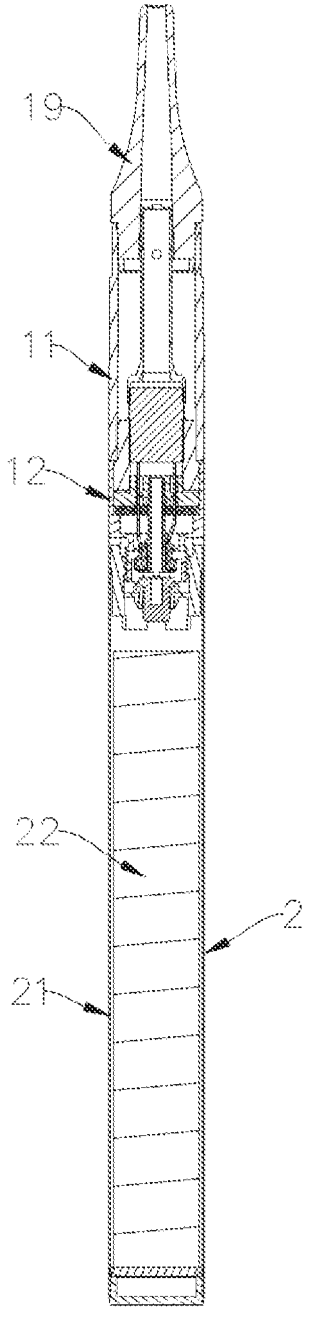
FIG. 2 is a schematic cross-sectional structural diagram of the electronic vaporization device in FIG. 1.

FIG. 1 and FIG. 2 show an electronic vaporization device according to a first embodiment of the present invention. The electronic vaporization device may be roughly cylindrical, and includes a cylindrical vaporizer 1 and a cylindrical power supply unit 2 that is axially and detachably connected to the vaporizer 1. The vaporizer 1 is configured to accommodate a liquid substrate, heat and vaporize the liquid substrate, and convey vapor. The power supply unit 2 is configured to supply power to the vaporizer 1 and control operations such as turn-on or turn-off of the entire electronic vaporization device, and may include a housing 21, and a battery 22, a circuit board, and an airflow sensor that are disposed in the housing 21. It may be understood that the electronic vaporization device is not limited to a cylindrical shape, and may alternatively be in other shapes such as an elliptical column, a square column, and a flat column.

Figure 3:
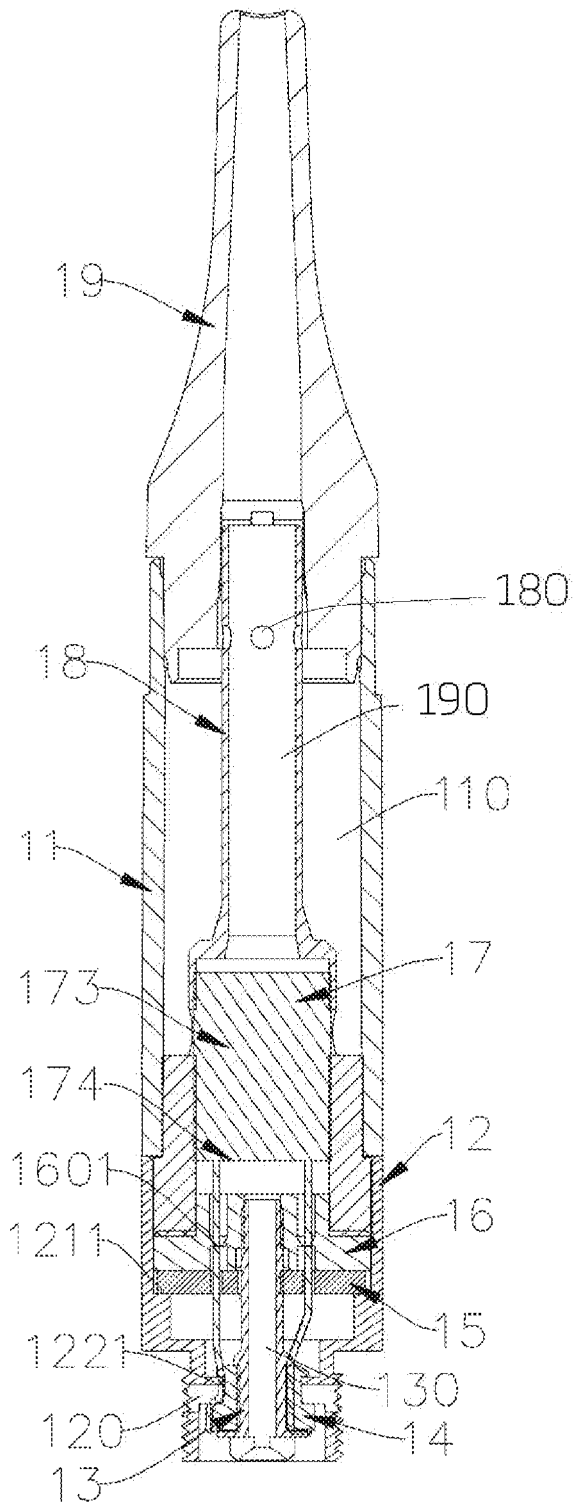
FIG. 3 is a schematic cross-sectional structural diagram of a vaporizer in FIG. 1.
Figure 4:
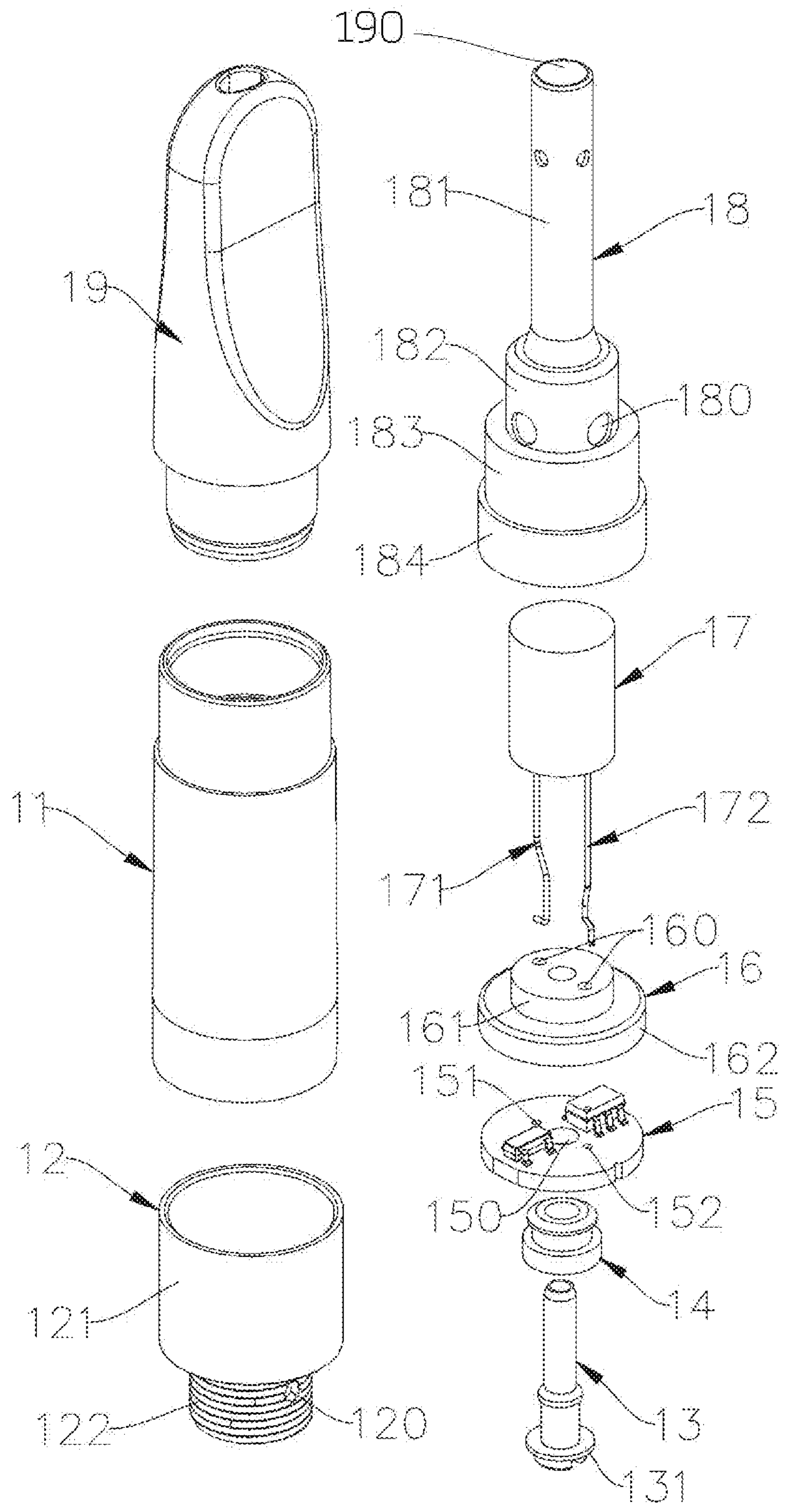
FIG. 4 is a schematic exploded structural diagram of the vaporizer in FIG. 1.

As shown in FIG. 3 and FIG. 4, the vaporizer 1 may include a housing 11 with a liquid storage cavity 110 formed inside, a suction nozzle 19 disposed longitudinally at the upper opening of the housing 11, a base 12 disposed longitudinally at the lower opening of the housing 11, a vent tube 18 disposed longitudinally in the housing 11, a vaporization component 17 disposed longitudinally in the vent tube 18 and in fluid communication with the liquid storage cavity 110, an anti-counterfeiting module 15 disposed in the base 12, and a protective sleeve 16 disposed on the anti-counterfeiting module 15. Preferably, the base 12, the anti-counterfeiting module 15, the protective sleeve 16, the housing 11, the vent tube 18, the vaporization component 17, and the suction nozzle 19 are coaxially combined.

The annular liquid storage cavity 110 is defined between the inner wall surface of the housing 11 and the outer wall surface of the vent tube 18 to store a liquid substrate. At least one liquid inlet hole 180 (four liquid inlet holes in this embodiment) is provided on the vent tube 18 for fluid communication between the vaporization component 17 and the liquid storage cavity 110. An airflow channel 190 is defined on the inner wall surface of the vent tube 18, and the suction nozzle 19 is hermetically sealed above the liquid storage cavity 110 and the airflow channel 190. Vapor generated by the vaporization component 17 through vaporization is mixed with air and then flows through the airflow channel 190 to the suction nozzle 19 for a user to inhale.

In some embodiments, the base 12 may include a cylindrical body part 121 and a cylindrical butt part 122 that is integrally combined with the lower portion of the body part 121 longitudinally. Both the outer diameter and the inner diameter of the body part 121 are larger than the outer diameter and the inner diameter of the butt part 122. An external thread is formed on the outer wall surface of the butt part 122 for screwing with the power supply unit 2.

The base 12 may be made of a conductive material such as stainless steel. An ejector pin 13 may be disposed longitudinally on the base 12 in an insulated manner, and the base 12 and the ejector pin 13 are electrically connected to the negative pole and the positive pole of the battery 22 respectively. In some other embodiments, the base 12 and the ejector pin 13 may alternatively be electrically connected to the positive pole and the negative pole of the battery 22 respectively. A cylindrical insulating sleeve 14 may be further disposed between the base 12 and the ejector pin 13 to insulate the base 12 and ejector pin 13. The outer wall surface of the ejector pin 13 extends outward radically to form a flange part 131, and the upper end surface of the flange part 131 may abut against the lower end surface of the insulating sleeve 14.

The ejector pin 13 may be cylindrical, and an air inlet channel 130 is formed longitudinally in the ejector pin. The upper end of the air inlet channel 130 can extend into the airflow channel 190 and communicate with the airflow channel 190. At least one air inlet hole 120 (two air inlet holes in this embodiment) is provided on the butt part 122 to enable outside air to enter the air inlet channel 130. A block wall 1221 is disposed on the side of each air inlet hole 120 facing the anti-counterfeiting module 15, to prevent airflow from entering the inside of the base 12 to be in contact with the anti-counterfeiting module 15, thereby preventing the anti-counterfeiting module 15 from being damp or damaged due to contact with the airflow.

The vaporization component 17 may include a liquid absorbing body 173 configured to absorb a liquid substrate from the liquid storage cavity 110, a heating body 174 disposed on the liquid absorbing body 173, and a first pin 171 and a second pin 172 that are electrically connected to the heating body 174. The first pin 171 and the second pin 172 are electrically connected to the base 12 and the ejector pin 13 respectively.

The housing 11 may be roughly cylindrical, and the lower end surface of the housing 11 may abut against the upper end surface of the body part 121. The outer diameter of the housing 11 is equal to the outer diameter of the body part 121.

The vent tube 18 may include a first tube section 181, a second tube section 182, a third tube section 183, and a fourth tube section 184 that are connected sequentially from top to bottom. The inner diameters of the second tube section 182, the third tube section 183, and the fourth tube section 184 are the same and are all larger than the inner diameter of the first tube section 181. The vaporization component 17 may be tightly embedded in the second tube section 182, the third tube section 183, and the fourth tube section 184. At least one liquid inlet hole 180 (four liquid inlet holes in this embodiment) is provided on the second tube section 182 for fluid communication between the vaporization component 17 and the liquid storage cavity 110. The outer diameters of the first tube section 181, the second tube section 182, the third tube section 183, and the fourth tube section 184 increase sequentially. The third tube section 183 is tightly embedded at the lower end of the housing 11. The third tube section 183 and the housing 11 may be fixedly connected by riveting, adhesive bonding, ultrasonic welding, or the like. The fourth tube section 184 is tightly embedded at the upper end of the base 12. The fourth tube section 184 and the base 12 may be fixedly connected by riveting, adhesive bonding, ultrasonic welding, or the like. The step surface formed between the third tube section 183 and the fourth tube section 184 may abut against the lower end surface of the housing 11.

The anti-counterfeiting module 15 may be a PCB circuit board, and may be roughly a round plate. Two poles of the anti-counterfeiting module 15 are electrically connected to the base 12 and the ejector pin 13 respectively to supply power to the anti-counterfeiting module 15. The anti-counterfeiting module 15 may be disposed in the body part 121. A step 1211 configured to support the anti-counterfeiting module 15 is formed on the inner wall surface of the body part 121, and at least part of the lower end surface of the anti-counterfeiting module 15 is in electrical contact with the step 1211. A through hole 150 is provided longitudinally on the anti-counterfeiting module 15, the ejector pin 13 penetrates into the through hole 150, and the outer wall surface of the ejector pin 13 is in electrical contact with the hole wall of the through hole 150. To be specific, electrically conductive layers may be formed on part of the lower end surface of the anti-counterfeiting module 15 and the hole wall of the through hole 150 respectively by spraying, electroplating, or the like, to implement electrical contact with the base 12 and the ejector pin 13 respectively through the electrically conductive layers.

A first via 151 for the first pin 171 to pass through and a second via 152 for the second pin 172 to pass through are formed respectively on the anti-counterfeiting module 15. The first pin 171 and the second pin 172 may be welded to the first via 151 and the second via 152 for electrical connection respectively. After passing through the first via 151, the first pin 171 is clamped between the outer wall surface of the insulating sleeve 14 and the inner wall surface of the butt part 122 in an interference-fitting manner, to be in electrical contact with the base 12. After passing through the second via 152, the second pin 172 is clamped between the inner wall surface of the insulating sleeve 14 and the outer wall surface of the ejector pin 13 in an interference-fitting manner, to be in electrical contact with the ejector pin 13. The end of the second pin 172 may be bent and then clamped between the upper end surface of the flange part 131 and the lower end surface of the insulating sleeve 14 to increase the contact area between the second pin 172 and the ejector pin 13. Such interference-fitting conduction manner is more efficient than welding and reduces a welding process. The interference fit further ensures reliability of connection and improves the product yield. In addition, if wielding is performed, the space is small and it is difficult to operate, making it difficult to control the wielding yield.

The function of the protective sleeve 16 is to protect the anti-counterfeiting module 15 from being damaged, being in contact with a liquid substrate, and the like. The protective sleeve may be made of an elastic material such as silica gel. In some embodiments, the protective sleeve 16 may include an upper nesting part 161 with a smaller outer diameter and a lower contact part 162 with a larger outer diameter. The nesting part 161 may be tightly nested in the vent tube 18, and the upper end of the ejector pin 13 may pass through the anti-counterfeiting module 15 and may be embedded in the nesting part 161. The lower end surface of the vent tube 18 may abut against the upper end surface of the contact part 162, and the lower end surface of the contact part 162 abuts against the upper end surface of the anti-counterfeiting module 15, so that the protective sleeve 16 and the anti-counterfeiting module 15 are clamped and fixed between the lower end surface of the vent tube 18 and the upper end surface of the step 1211. In some other embodiments, the protective sleeve 16 and the anti-counterfeiting module 15 may alternatively be integrated, so that the protective sleeve 16 does not need to be disposed independently. In this case, two contacts may be further disposed on the first pin 171 and the second pin 172 for electrical contact with two contacts on the anti-counterfeiting module 15, so that no welding process is required.

Two electrode holes 160 for the first pin 171 and the second pin 172 to pass through are respectively provided on the protective sleeve 16. A thin wall 1601 may be formed in the electrode holes 160, and the thin wall 1601 separates the electrode holes 160 into two parts that do not communicate up and down. During installation of the vaporization component 17, the first pin 171 and the second pin 172 can pierce through the thin wall 1601 and pass through the electrode holes 160. The function of the thin wall 1601 is to enable the protective sleeve 16 to wrap the first pin 171 and the second pin 172. When a liquid substrate seeps from the side of the vaporization component 17 into the electrode holes 160, the liquid substrate can remain on the upper side of the thin wall 1601 and does not seep into the anti-counterfeiting module 15 and damage the anti-counterfeiting module 15.

It may be understood that in some other embodiments, the vaporizer 1 may alternatively not be provided with the anti-counterfeiting module 15. In this case, it is only required that the first pin 171 and the second pin 172 of the vaporization component 17 are electrically connected to the base 12 and the ejector pin 13, and the electrical connection manner may be welding, riveting, crimping, or the like.

Figure 5:
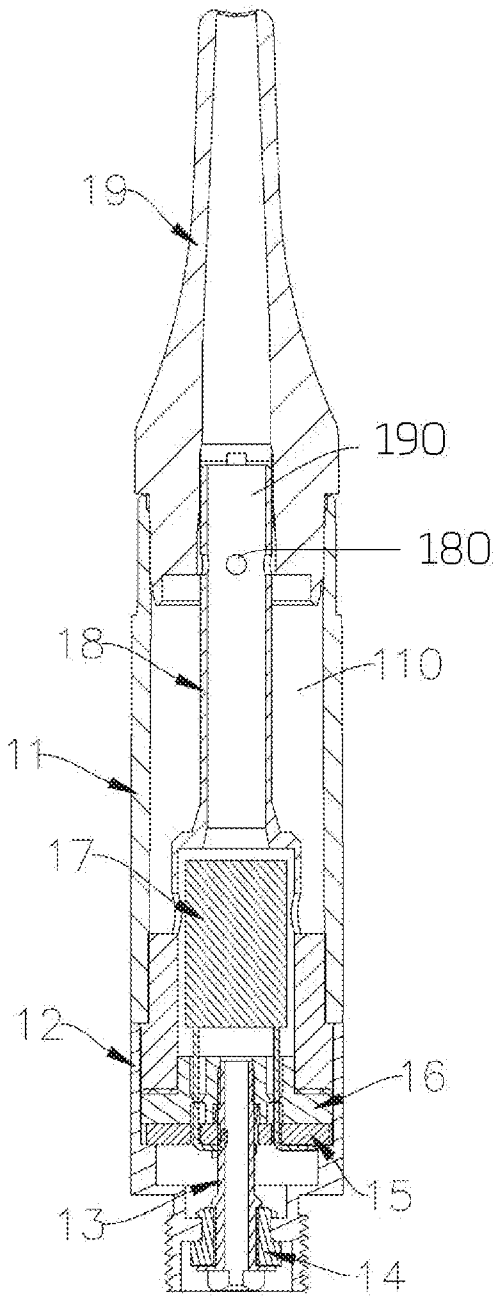
FIG. 5 is a schematic cross-sectional structural diagram of a vaporizer according to a second embodiment of the present invention.
Figure 6:
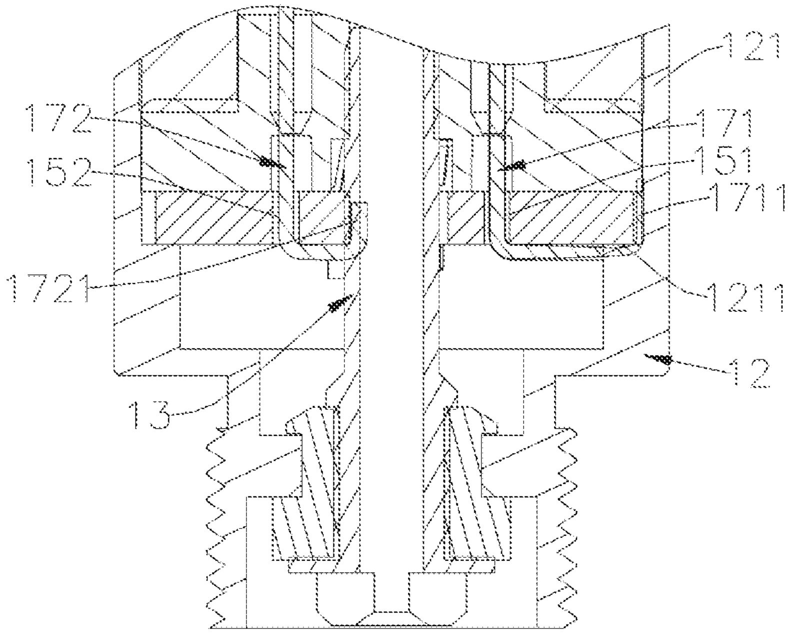
FIG. 6 is a partially enlarged schematic structural diagram of the vaporizer in FIG. 5.
Figure 7:
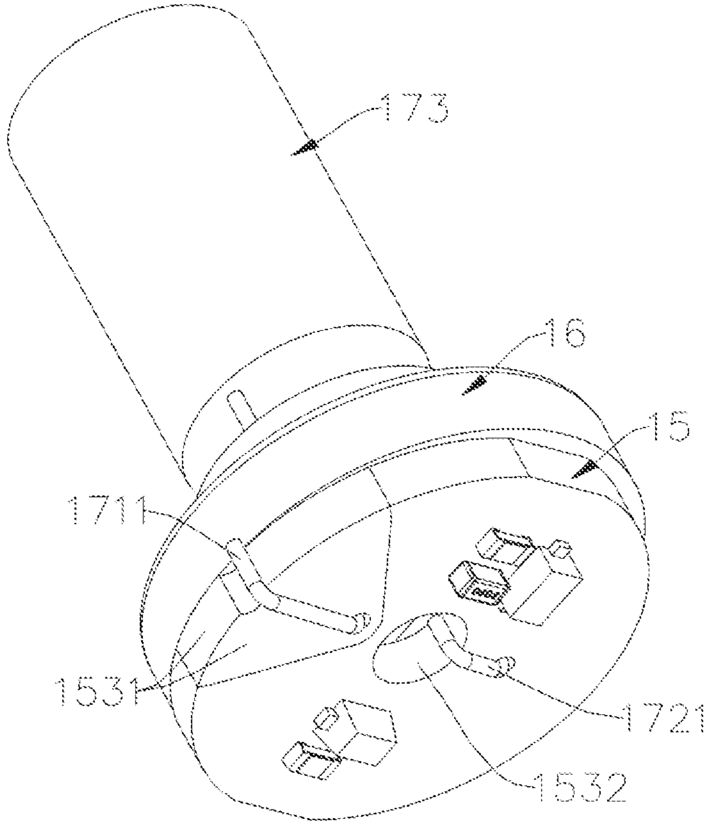
FIG. 7 is a schematic structural diagram of assembly of a vaporization component, a protective sleeve, and an anti-counterfeiting module in FIG. 5.

FIG. 5 to FIG. 7 show a vaporizer 1 according to a second embodiment of the present invention. A main difference between the vaporizer 1 in the second embodiment and that in the first embodiment is as follows:

In this embodiment, after passing through the first via 151, the first pin 171 bends, and a first contact part 1711 at the end of the first pin 171 away from the heating body is clamped between the anti-counterfeiting module 15 and the body part 121 in an interference-fitting manner. The first pin 171 is in electrical contact with the step 1211 and the inner peripheral surface of the body part 121 through the first contact part 1711, to electrically connect the first pin 171 and the base 12. In addition, a first electrically conductive layer 1531 may be further formed at part of the lower end surface of the anti-counterfeiting module 15 and at part of the outer peripheral surface correspondingly connected to the part of the lower end surface by spraying, electroplating, or the like. The first pin 171 may be further in electrical contact with the first electrically conductive layer 1531 through the first contact part 1711, to electrically connect the first pin 171 and the anti-counterfeiting module 15. Such interference-fitting conduction manner can avoid a welding operation on the first via 151, and improve processing efficiency and the product yield. In some other embodiments, the first pin 171 may alternatively be welded in the first via 151 for electrical connection to the anti-counterfeiting module 15.

The second pin 172 passes through the second via 152 and bends, and a second contact part 1721 at the end of the second pin 172 away from the heating body is clamped between the hole wall of the through hole 150 and the outer wall surface of the ejector pin 13. The second pin 172 is electrically connected to the outer wall surface of the ejector pin 13 through the second contact part 1721, to electrically connect the second pin 172 and the ejector pin 13. A second electrically conductive layer 1532 may be formed on the hole wall of the through hole 150 of the anti-counterfeiting module 15 by spraying, electroplating, or the like. The second pin 172 is in electrical contact with the second electrically conductive layer 1532 through the second contact part 1721, to electrically connect the second pin 172 and the anti-counterfeiting module 15. This can avoid a welding operation on the second via 152, and improve processing efficiency and the product yield. In some other embodiments, the second pin 172 may alternatively be welded in the second via 152 for electrical connection to the anti-counterfeiting module 15.

It may be understood that in some other embodiments, one of the first pin 171 and the second pin 172 may be assembled in the manner shown in the first embodiment, and the other may be assembled in the manner shown in the second embodiment.

It may be understood that the foregoing technical features may be used in any combination without limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A vaporizer, comprising:
an electrically conductive base;
an ejector pin disposed on the electrically conductive base in an insulated manner;
an anti-counterfeiting module electrically connected to the electrically conductive base and the ejector pin, respectively;
a housing with a liquid storage cavity formed inside; and
a vaporization component disposed in the housing and in fluid communication with the liquid storage cavity, the vaporization component comprising a heating body, a first pin, and a second pin,
wherein the first pin and the second pin are each electrically connected to the heating body,
wherein the first pin is in electrical contact with the anti-counterfeiting module and is electrically connected to the electrically conductive base, and
wherein the second pin is in electrical contact with the anti-counterfeiting module and is electrically connected to the ejector pin.

2. The vaporizer of claim 1, wherein the anti-counterfeiting module is disposed in the electrically conductive base,
wherein a through hole is provided on the anti-counterfeiting module, and
wherein the ejector pin penetrates into the through hole.

3. The vaporizer of claim 2, wherein a hole wall of the through hole is in electrical contact with an outer wall surface of the ejector pin.

4. The vaporizer of claim 2, wherein a step configured to support the anti-counterfeiting module is formed on an inner wall surface of the electrically conductive base, and
wherein at least part of a lower end surface of the anti-counterfeiting module is in electrical contact with the step.

5. The vaporizer of claim 1, wherein the anti-counterfeiting module defines a first via for the first pin to pass through and a second via for the second pin to pass through.

6. The vaporizer of claim 5, wherein the first pin is welded to the first via for electrical connection, and/or the second pin is welded to the second via for electrical connection.

7. The vaporizer of claim 5, wherein the first pin comprises a first contact part, and
wherein the first pin passes through the first via and bends to cause the first contact part to be clamped between the anti-counterfeiting module and the electrically conductive base so as to be in electrical contact with the electrically conductive base.

8. The vaporizer of claim 5, wherein the second pin comprises a second contact part, and
wherein the second pin passes through the second via and bends to cause the second contact part to be clamped between the anti-counterfeiting module and the ejector pin so as to be in electrical contact with the ejector pin.

9. The vaporizer of claim 5, further comprising:
an insulating sleeve disposed between the electrically conductive base and the ejector pin to insulate the electrically conductive base and the ejector pin.

10. The vaporizer of claim 9, wherein the first pin passes through the first via and is clamped between an outer wall surface of the insulating sleeve and an inner wall surface of the electrically conductive base so as to be in electrical contact with the electrically conductive base.

11. The vaporizer of claim 9, wherein the second pin passes through the second via and is clamped between an inner wall surface of the insulating sleeve and an outer wall surface of the ejector pin so as to be in electrical contact with the ejector pin.

12. The vaporizer of claim 5, further comprising:
a protective sleeve disposed on a side of the anti-counterfeiting module facing the liquid storage cavity.

13. The vaporizer of claim 12, wherein two electrode holes for the first pin and the second pin to pass through are respectively provided on the protective sleeve, and
wherein a thin wall for the first pin and the second pin to pierce through is formed in the two electrode holes.

14. The vaporizer of claim 1, further comprising:
a vent tube disposed in the housing,
wherein the liquid storage cavity is defined between an inner wall surface of the housing and an outer wall surface of the vent tube, and
wherein the vaporization component is disposed in the vent tube.

15. The vaporizer of claim 1, wherein at least one air inlet hole in communication with the outside is provided on the electrically conductive base, and wherein at least one air inlet channel in communication with the at least one air inlet hole is formed on the ejector pin.

16. The vaporizer of claim 15, wherein a block wall is disposed on a side of each air inlet hole facing the anti-counterfeiting module so as to separate the air inlet hole from the anti-counterfeiting module.

17. The vaporizer of claim 1, wherein the anti-counterfeiting module comprises a PCB circuit board.

18. An electronic vaporization device, comprising:

the vaporizer of claim 1.

* * * * *